Feb. 14, 1956 M. G. ANDERSON 2,734,568

METHOD AND APPARATUS FOR PRODUCING LACERATIONS IN THE ROAD-CONTACTING SURFACE OF A TIRE

Filed April 22, 1952 2 Sheets-Sheet 1

INVENTOR.
MALCOLM G. ANDERSON

BY

R. L. Miller
ATTORNEY

Feb. 14, 1956 M. G. ANDERSON 2,734,568

METHOD AND APPARATUS FOR PRODUCING LACERATIONS IN THE ROAD-CONTACTING SURFACE OF A TIRE

Filed April 22, 1952 2 Sheets-Sheet 2

INVENTOR.
MALCOLM G. ANDERSON

BY

R. L. Miller
ATTORNEY

United States Patent Office 2,734,568

Patented Feb. 14, 1956

2,734,568

METHOD AND APPARATUS FOR PRODUCING LACERATIONS IN THE ROAD-CONTACTING SURFACE OF A TIRE

Malcolm G. Anderson, Hudson, Ohio, assignor, by mesne assignments, to The Goodyear Tire & Rubber Company, a corporation of Ohio Application April 22, 1952, Serial No. 283,714

7 Claims. (Cl. 164—10.2)

This invention relates to a method and an apparatus for producing lacerations in the road-contacting surface of a tire and more particularly to an improved apparatus for improving the skid resistance and tractive characteristics of the road-contacting surface of such tires.

In the past many attempts have been made to provide a tire tread which possesses a better coefficient of friction with respect to the road surface without sacrificing the mileage life of the tire. These attempts have been primarily directed toward special tread compounds, special tread designs or devices that are attached to the tire or wheels, but each of these presents certain disadvantages that have limited their acceptance by the motoring public.

The tire tread produced by the teachings of the Sanderson Patent 2,504,090, issued April 11, 1950, is one that overcomes many of the disadvantages of the previous attempts and has been outstanding in traction and stopping tests conducted when compared to other types of skid-resistant tires or accessories. The present invention is directed to an improved apparatus and method for accomplishing the teachings of the Sanderson patent.

It is therefore an object of the present invention to provide an apparatus for treating tire treads to increase their coefficient of friction with the road surface.

Another object of this invention is to provide an apparatus that will treat the tread of a vehicle tire without the necessity of the tire being mounted on the vehicle.

A still further object of this invention is to provide an apparatus that quickly and easily processes the tire tread.

A particular object of this invention is to provide an apparatus and method for treating a tire tread to produce a uniform treatment in a single operation across the road-contacting surface of the tire.

Another particular object of the invention is to provide a method of treating tire treads which requires a single inflation pressure of the tire during the operation.

Other objects of this invention will appear hereinafter as the description thereof proceeds, the novel features, arrangements and combinations being clearly pointed out in the specification and in the claims thereunto appended, as well as in the drawings.

It has been found that in order to uniformly lacerate the road-contacting surface of a tire tread with existing conventional apparatus, it has been necessary to inflate the tire to a high pressure and to vary the pressure to assure full penetration of center portion of the road-contacting surface of the tire tread. If this is not done the shoulder portions of road-contacting surface alone in most instances are thoroughly processed with a reduced degree of processing in the center portion. In the apparatus of the present invention, however, the center portion and shoulder portions are processed simultaneously with a single inflation which not only is a more convenient method but also less time consuming.

Figure 1:
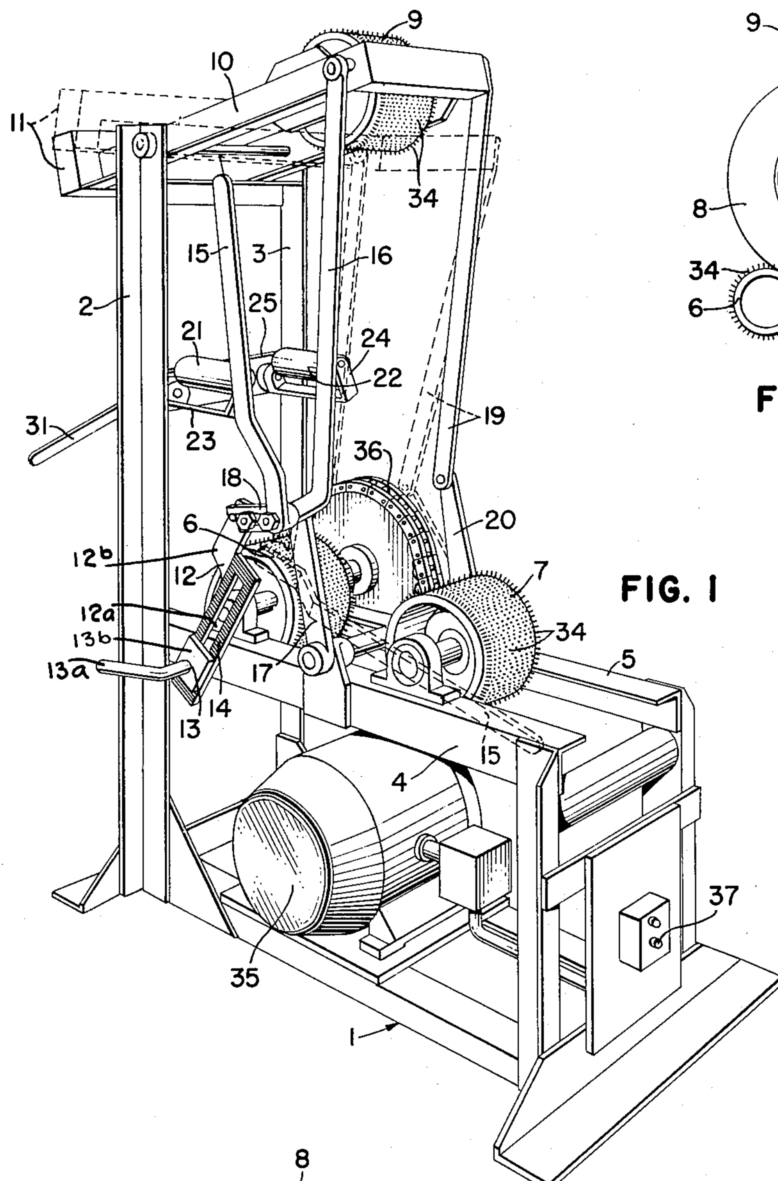
Fig. 1 is an isometric view of the apparatus as a whole.
Figure 3:
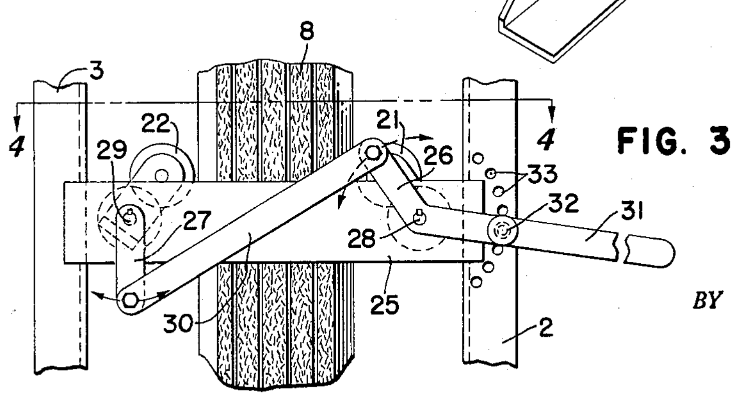
Fig. 3 is a detailed elevation of the adjusting means of the apparatus.

In Fig. 1, an embodiment of the invention comprises a base 1 supporitng the upright members 2 and 3 to which horizontal members 4 and 5 are attached to form the basic frame of the apparatus. Adequate bracing elements and cross members are provided to form a rigid structure. A pair of rotatably mounted rolls 6 and 7 are mounted on the horizontal members 4 and 5 to support a tire 8 for circumferential rotation and the third roll 9 in combination with rolls 6 and 7 provide means for treating the road-contacting surface of the tire 8, the tire being supported substantially as illustrated in Fig. 3.

In the form of the apparatus illustrated, the rolls 6 and 7 are parallel and are fixed and roll 9 is adapted to move into engagement with the tire 8 after it is placed in engagement with rolls 6 and 7. The roll 9, parallel to rolls 6 and 7, is rotatably mounted on a shaft carried by the framework 10, which in turn is pivotally mounted between the upright members 2 and 3. A counterweight 11 is used to balance the framework. The position of roll 9 relative to the rolls 6 and 7 may be changed by moving the adjusting arm 12 then tightening the clamp 13 to maintain the roll 9 in the desired position. The adjusting arm 12 includes a slot 12*a* through which the shank (not shown) of the clamp 13 passes to permit the arm 12 to be selectively positioned along the clamp. As shown an offset portion 12*b* is formed adjacent one end of the arm 12, to which a toggle link is attached for purposes later described. The clamp 13 as shown comprises a handle 13*a* and a clamping member 13*b* on the shank which passes through an opening in the framework member 4. The inner end of the shank may be threaded to receive a nut or enter a threaded opening in the framework member 4 so that the clamp may be tightened to lock the arm 12 into position. As illustrated, the arm 12 has a series of serrations 14 on the surface and the clamp 13 has mating serrations to firmly lock the assembly in the desired position.

The rolls preferably should be arranged so that the tire is supported between the rolls and the pressure exerted by any one of the rolls does not tend to pop the tire out of the apparatus. In other words the plane through the axis of any roll normal to the plane common to and between the axes of the other two rolls will intersect the second-mentioned plane. Additional auxiliary supporting rolls may be used if desired to assist in guiding and supporting the tire if desired.

After the tire 8 is placed in position in engagement with the rolls 6 and 7, with the roll 9 in the position shown in Fig. 1, the roll 9 is moved into engagement with the periphery of tire 8 by swinging the handle 15 down to the dotted-line position. The initial position of the roll 9 is adjusted to a position so that when it is brought into the operative position, sufficient pressure is exerted on the tire by the roll 9 to deflect the tire 8 as explained later. One means that is adopted to readily force the roll 9 into the tire 8 is the toggle linkage, in which the arms 16 and 17 are pivotally attached to the framework 10 and horizontal member 4 of the frame respectively. The adjacent ends of arms 16 and 17 are pivotally connected to a toggle link 18 which is pivotally mounted to the arms 16 and 17 on one end and attached to the offset portion 12*b* of the arm 12 on the other. By moving the handle 15 in the direction indicated to the dotted line position, the toggle link 18 moves down about its connection to the arm 12, thus decreasing the included angle between the arms 16 and 17 which moves the framework 10 toward the base, thus bringing roll 9 closer to rolls 6 and 7. Preferably to prevent twisting of the framework 10, arms 19 and 20, of the same general proportions as arms 16 and 17, are connected similarly to the opposite side of the framework 10 and the horizontal member 5, respectively, with the adjacent ends of arms 19 and 20 pivotally connected together.

Figure 4:
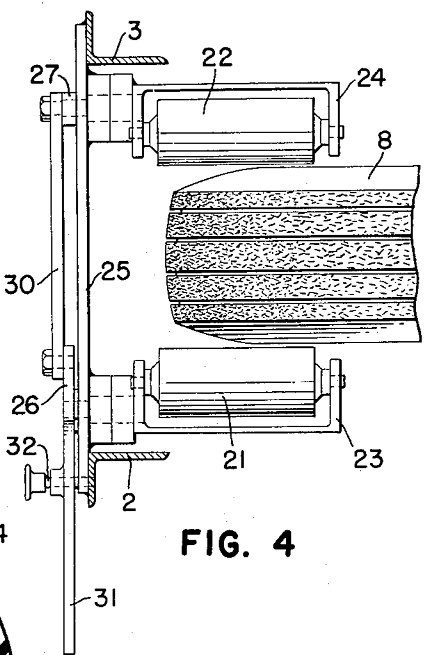
Fig. 4 is a plan view with parts in section and broken away taken on line 4—4 of Fig. 3.

If desired, guide means may be provided to assist in maintaining the tire approximately central in the rolls 6, 7 and 9 during the processing operation. For example, rolls 21 and 22 are mounted with their axes substantially horizontal in brackets 23 and 24 which in turn are pivotally mounted to cross member 25 extending between upright members 2 and 3 (Figs. 3 and 4). Short link members 26 and 27 of equal length are fixed to the shafts 28 and 29 of the bracket mountings and a connecting member 30 joins the opposite ends of the link members 26 and 27. A handle 31 is attached to the shaft 29 to provide a convenient means of adjusting the position of the rolls 21 and 22 and as the handle 31 is moved the rolls 21 and 22 are moved symmetrically about the center of the apparatus. A spring-pressed pin 32 which engages a series of arcuately spaced holes 33 in the upright member 2 is illustrated as a convenient means of locking the rolls in the desired position.

Figure 5:
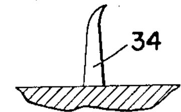
Fig. 5 is an enlarged view of one of the elements used for treating the tire tread.

Lacerating pins or projections 34 are distributed over the surfaces of the roll 9 and at least one of the rolls 6 or 7, preferably both, to lacerate the road-contacting surface of the tire 8 as the tire is rotated in rolling contact with the rolls 6, 7 and 9. One form of the lacerating projection 34 is shown in Fig. 5 in which the outer extremity of the projection has a hook-like contour although a straight conical section or any other form may be used if desired. The projections 34 are of such a length as to lacerate the tread rubber only but not penetrate the fabric body portion of the tire.

A motor 35 is mounted on the base 1 of the frame and is connected to the roll 6 by means of a chain and sprocket drive 36 and a switch 37 is provided for starting and stopping the motor. After the tire 8 is placed in the apparatus, the motor 35 is started which drives roll 6 which in turn rotates the tire 8 to cause rolls 7 and 9 also to be rotated in rolling contact with the tire at substantially the same peripheral speed.

Figure 2:
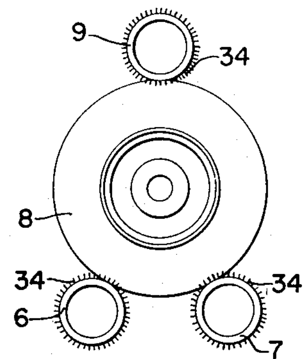
Fig. 2 is a diagrammatic representation of the tire-treating portion of the apparatus.
Figure 6:
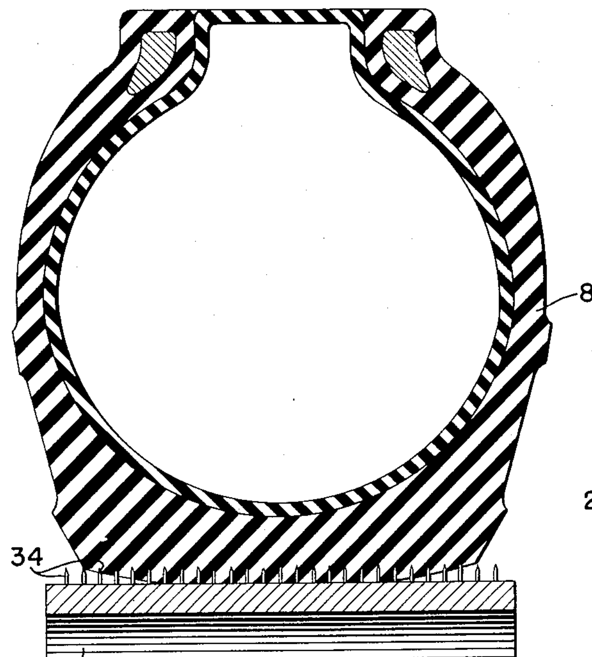
Fig. 6 illustrates the relation of the tire to one of the elements of the machine.
Figure 7:
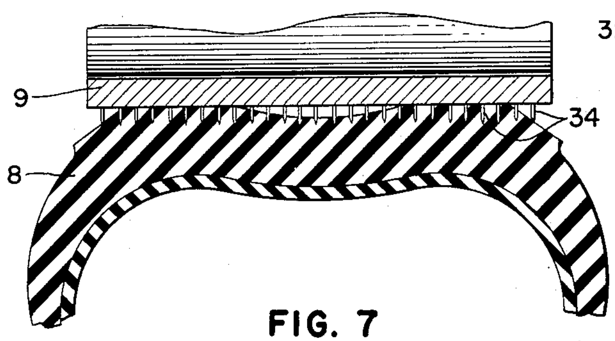
Fig. 7 illustrates the relation of the tire to another element of the machine.

In the operation of the apparatus, a tire 8 mounted on a wheel and inflated in the usual manner is placed centrally on the lower supporting rolls 6 and 7 and the position of roll 9 is adjusted to a position so that when the roll is brought into the operating position, the roll 9 deflects the tire 8 sufficiently at the point of contact to provide full penetration of the shoulder portion of the tire as represented in Fig. 7. In the preferred arrangement of the roll shown in Fig. 2, the deflection of the tire 8 at rolls 6 and 7 is approximately one-half of that at roll 9 which provides full penetration of the center portion of the tread as illustrated in Fig. 6. The roll 9 in this arrangement is substantially diametrically opposed to the pair of rolls 6 and 7 and as a result the pressure of the rolls 6 and 7 against the tire tread is approximately one-half of that of the roll 9 because the rolls 6 and 7 substantially support between them the force exerted by roll 9 alone.

After the roll 9 is brought into the operative position, the guide rolls 21 and 22 are then moved to a position close to the sidewall portions of the tire to maintain the tire centered on the rolls. The motor is then started and the tire is run until the tread is thoroughly treated, the time required varies depending on the size of the tire but usually a five-to-ten-minute run is sufficient to produce a greatly improved traction and skid-resistant tire tread.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. Apparatus for producing multitudinous pin-hole lacerations in closely spaced relation in the road-contacting surface of a tire to increase the traction and skid resistance thereof, said apparatus comprising a pair of rolls rotatably mounted in spaced relation and adapted to engage and support the road-contacting surface of an inflated tire for circumferential rotation, a rotatable third roll adjustably mounted in spaced relation and substantially diametrically opposed to said pair of rolls and adapted to engage the road-contacting surface of said tire, the distance between said third roll and either of said pair of rolls being substantially greater than the distance between said pair of rolls, lacerating pins projecting from and distributed over the peripheral surface of said third roll and at least one roll of said pair of rolls, means to urge said third roll against the road-contacting surface to embed the pins in the road-contacting surface of said tire and means to rotate at least one of said rolls, whereby the road-contacting surface of the tire is rotated simultaneously in rolling contact with each of said rolls.

2. Apparatus for producing multitudinous pin-hole lacerations in closely spaced relation in the road-contacting surface of a tire to increase the skid resistance thereof, said apparatus comprising a pair of rolls rotatably mounted in spaced relation and adapted to engage and support the road-contacting surface of an inflated tire for circumferential rotation, a rotatable third roll adjustably mounted in spaced relation and substantially diametrically opposed to said pair of rolls and adapted to engage the road-contacting surface of the tire, the distance between said third roll and either of said pair of rolls being substantially greater than the distance between said pair of rolls, lacerating pins projecting from and distributed over the peripheral surface of each of said rolls, means to urge said third roll against the road-contacting surface to embed the pins in the road-contacting surface and means to rotate at least one of said rolls whereby the road-contacting surface of the tire is rotated simultaneously in rolling, piercing contact with each of said rolls.

3. Apparatus for producing multitudinous pin-hole lacerations in closely spaced relation in the road-contacting surface of a tire to increase the skid resistance thereof, said apparatus comprising a pair of rolls rotatably mounted in spaced relation and adapted to engage and support the road-contacting surface of an inflated tire for circumferential rotation, a rotatable third roll adjustably mounted in spaced relation and substantially diametrically opposed to said pair of rolls and adapted to engage the road-contacting surface of the tire, the distance between said third roll and either of said pair of rolls being substantially greater than the distance between said pair of rolls, lacerating pins projecting from and distributed over the peripheral surface of each of said rolls, toggle linkage to force said third roll against the road-contacting surface to embed the pins in the road-contacting surface, a pair of adjustably mounted elements adapted to engage the sidewall portions of the tire to guide said tire, and means to rotate at least one of said rolls whereby the road-contacting surface of the tire is rotated simultaneously in rolling, piercing contact with each of said rolls.

4. Apparatus for producing multitudinous pin-hole lacerations in closely spaced relation in the road-contacting surface of a tire to increase the skid resistance thereof, said apparatus comprising at least three rolls constructed and arranged to engage and support therebetween the road-contacting surface of an inflated tire for circumferential rotation with the distance between one of said rolls and either of said other two rolls being substantially greater than the distance between said other two rolls, said rolls being mounted upon axes of rotation arranged in spaced and mutually parallel relation and each of said rolls having its axis of rotation disposed in a plane normal to a plane common to and between the axes of the other two rolls; lacerating pins projecting from and distributed over the peripheral surface of the first mentioned roll and at least one of said other two rolls, means to move at least one of said rolls relative to the other rolls to cause said lacerating pins to be forced into engagement with the road-contacting surface of a tire, and means to rotate at least one of said rolls in rolling contact with the tire whereby the road-contacting surface of the tire is rotated simultaneously in rolling contact with each of said other rolls.

5. Apparatus for producing multitudinous pin-hole lacerations in closely spaced relation in the road-contacting surface of a tire to increase the skid resistance thereof, said apparatus comprising three rolls mounted in spaced relation adapted to engage and support the road-contacting surface of an inflated tire for circumferential rotation, said rolls comprising a pair of rolls and a third roll, lacerating pins projecting from and distributed over the peripheral surface of said third roll and at least one of said pair of rolls, means to force the rolls against the road-contacting surface to embed the pins in said road-contacting surface and means to rotate at least one of said rolls whereby the road-contacting surface of the tire is rotated simultaneously in rolling contact with each of said rolls, the distance between the pair of rolls being substantially less than the distance between the third roll and either of said pair of rolls to provide a greater degree of deflection of the tire at said third roll than at said pair of rolls.

6. The method of improving the skid resistance of a vehicle tire, comprising the steps of mounting and inflating a tire on a wheel, supporting the tire between a pair of rolls and a third roll having lacerating pins projecting from and distributed over the peripheral surface of at least the third roll and one of said pairs of rolls with the distance between the third roll and either of said pair of rolls being substantially greater than that between said pair of rolls and the axis of rotation of each roll disposed in a plane normal to a plane common to and between the axes of the other two rolls, forcing at least one of the rolls against the road-contacting surface of the tire to embed the lacerating pins therein, thus creating substantially greater tire deflection at the third roll than at either of said pair of rolls, and then rotating the rolls in rolling, piercing contact therewith to form a multitude of irregularly and closely spaced lacerations in the road-contacting surface of the tire.

7. The method of improving the skid resistance of a vehicle tire comprising the steps of mounting and inflating a tire on a wheel, supporting the inflated tire and wheel between a pair of rolls and a third roll having lacerating pins projecting from and distributed over the peripheral surfaces of at least the third roll and one of said pair of rolls with the third roll being substantially diametrically opposed to said pair of rolls and the axis of rotation of each roll disposed in a plane normal to a plane common to and between the axes of the other two rolls, forcing at least one of the rolls against the road-contacting surface of the tire to embed the lacerating pins therein to create substantially greater tire deflection at the third roll than at either of said pair of rolls, and then rotating the rolls in rolling, piercing contact therewith to form a multitude of irregularly and closely spaced lacerations in the road-contacting surface of the tire.

References Cited in the file of this patent

UNITED STATES PATENTS

| | | |
|---|---|---|
| 1,498,935 | Shull | June 24, 1924 |
| 2,034,662 | McLaughlin et al. | Mar. 17, 1936 |
| 2,474,511 | Bacon | June 28, 1949 |
| 2,504,090 | Sanderson | Apr. 11, 1950 |
| 2,570,540 | Furnald | Oct. 9, 1951 |
| 2,623,591 | Furnald | Dec. 30, 1952 |